3,741,795
TABLETS FOR ORAL USE COATED WITH A STABILIZED SHELLAC SEALING COATING

Charles A. Signorino, King of Prussia, Pa., assignor to Colorcon Incorporated, West Point, Pa.
No Drawing. Original application May 9, 1969, Ser. No. 823,514, now abandoned. Divided and this application Dec. 7, 1971, Ser. No. 205,725
Int. Cl. A61k 9/00
U.S. Cl. 117—100 A          5 Claims

ABSTRACT OF THE DISCLOSURE

A tablet for oral use coated with a stabilized shellac sealing coating. The shellac is stabilized by adding a quantity of polymeric materials that contain basic groups. Such metrials include polyvinylpyrrolidone, polyvinylpyridine, and polyamide resins containing free amino groups. Such polymers block the carboxyl group of the shellac from cross-linking by providing an acid-base reaction between the shellac and the polymer.

CROSS REFERENCES TO RELATED PATENTS

This patent application is a division of my patent application Ser. No. 823,514 filed May 9, 1969, now abandoned.

BACKGROUND OF THE INVENTION

Shellac is well recognized in the field of coating pharmaceutical and food tablets as a very desirable sealant for solid forms, and it is widely used. The pharmaceutical industry coats pellets and tablets with a sealing film of shellac, and the candy industry uses large quantities of shellac to glaze all sorts of solid pieces. Perhaps no other material is as impermeable to gas and moisture vapor.

However, the use of shellac has several disadvantages. The nature of shellac changes in storage, particularly if the shellac is in an alcohol solution. One well-known problem is that aged shellac solutions do not dry on a tablet. Another problem has been that shellac coating on a tablet becomes hard in storage and sometimes becomes so hard that the tablet does not disintegrate after being ingested by a patient and passes through the body without disintegrating instead of disintegrating in the stomach or intestines as intended.

Because of these problems, much research and development energy and activity have been expended in attempting to improve or replace shellac as a coating for tablets.

SUMMARY OF THE INVENTION

Accordingly, it is an object of this invention to provide a stabilized shellac for use as a sealing coating for tablets, which stabilized shellac dries easily on the tablet form and does not harden on the tablet form while in storage so as to fail to disintegrate in the stomach or intestines of a patient when ingested.

It is another object to provide a method for making the stabilized shellac sealing film, and it is another object to provide a tablet having a sealing film of stabilized shellac. Shellac is a naturally occurring polyester which contains free hydroxyl and carboxyl groups. The failure to dry of aged shellac solutions, and the hardening of the shellac coating in storage, can be traced to these free hydroxyl and carboxyl groups in the shellac. Shellac in alcohol has a tendency in storage to esterify with the solvent so as to produce a non-drying material. The shellac after being applied to a tablet is capable of further polymerization and cross-linking with itself through the free hydroxyl and carboxyl groups. This ongoing polymerization on the tablet makes the shellac film coating less soluble and causes disintegration delays of the tablet in the stomach or intestines and these delays are objectionable.

This invention provides a shellac coating and method for making it which has improved stability both while in a storage solution and as a deposited film on a tablet. This is accomplished by mixing with the shellac a quantity of polymeric materials that contain basic groups. Such materials include polyvinylpyrrolidone (sometimes hereinafter abbreviated as PVP), polyvinylpyridine, and polyamide resins containing free amino groups. Such polymers block the carboxyl group of the shellac from cross-linking by providing an acid-base reaction between the shellac and the polymer. The basic group of the polyvinyl pyrrolidone complexes with the carboxyl group of the shellac to block esterification.

Adding any quantity of a basic polymer ties up some of the carboxyl groups and reduces the amount of carboxyl groups available for cross-linking, thus retarding the unwanted cross-linking in the shellac.

Adding too much basic polymer, more than is needed to retard the unwanted cross-linking of the shellac, produces a film having the characteristics of the polyvinylpyrrolidone and this is undesirable because polyvinyl pyrrolidone does not seal against the penetration of moisture.

The sealing characteristics of the shellac film are desirable in tablet coating, and the coating must be formulated to insure stability of the shellac without markedly modifying its desirable properties. This formulating requires a knowledge of the stoichiometry of shellac and the basic polymer used.

Shellacs vary as to composition, depending on the source and treatment of the shellac including the amount of rain, the health of the trees, whether the shellac has been dewaxed, how the shellac was decolorized, etc. Because of these variations, one mole of free carboxyl groups may be found in 600 grams of shellac solids, or may be found in 900 grams of shellac solids, or may be found anywhere between those weights of shellac solids. This variation occurs because shellac is a naturally occurring polymer and varies with its conditions of growth and treatment.

On the other hand, the polyvinylpyrrolidone is a synthetic material and may be made to a desired specification. One mole of basic groups may be found in 111 grams of polyvinylpyrrolidone.

The preferred stoichiometric ratio by mole of shellac free carboxyl groups to polyvinylpyrrolidone free basic groups is 1 to 1. However, because of the variation in the acid value of the shellac, the ratio by weight of the shellac to polyvinylpyrrolidone may be in the range of 600–900 grams shellac to 111 grams of polyvinylpyrrolidone.

The ratio by weight of other basic polymers to the shellac, to give the 1 to 1 mole ratio, may be worked out in the same manner as the shellac-polyvinylpyrrolidone weight ratio, with a knowledge of the stoichiometry of the basic polymer.

As little as 1% by weight of the polyvinylpyrrolidone compared to the shellac solids has been found to be helpful in stabilizing the shellac film coating, and as much as 20% by weight of polyvinylpyrrolidone compared to the shellac solids has been found to give good stability to the shellac film without losing the desirable sealing characteristics of the shellac film. Higher quantities of polyvinylpyrrolidone produce films that are more moisture sensitive and more moisture permeable. It has been found that the preferred concentration by mole of 1 to 1 free acid groups' to free basic groups results in a concentration of polyvinylpyrrolidone of 10–15% by weight of the shellac solids because the acid content of commercial shellac varies. This preferred concentration prevents further esterification and yet causes the stabilized shellac film to retain the desirable barrier qualities of shellac film coating.

While PVP is the preferred basic polymer, other polymers may be used including polyvinylpyridine, and polymers of polymerized linoleic acid with polyamines of the general formula n-HOOCRCOOH, where R is an alkyl group, plus n-$H_2NR^1NH_2$, where $R^1$ is an alkyl amine.

DESCRIPTION OF THE PREFERRED EMBODIMENTS

The stabilized shellac sealing film of the present invention comprises a quantity of shellac and polyvinylpyrrolidone or other basic polymer, mixed together in a solvent, with the ratio by mole of the shellac free carboxyl groups to the polyvinylpyrrolidone free basic groups being about 1 to 1.

One mole of free carboxyl groups may be found in anywhere from 600 to 900 grams of shellac solids, and one mole of free basic groups may be found in 111 grams of the polyvinylpyrrolidone.

The method of making a sealing film for a coating for tablets and the like comprises the steps of taking a desired quantity of shellac, titrating a specimen of the shellac to ascertain the number of moles of acid in the shellac, adding to the shellac a quantity of polyvinylpyrrolidone having the same number of moles of base, and mixing the shellac and polyvinylpyrrolidone together in a solvent.

The method may also include the steps of mixing a detackifier into the stabilized shellac sealing film to prevent picking in the tablet coating operation, mixing a plasticizer into the film to increase flexibility of the film, and mixing a colorant into the film to color the tablet.

The method may further include the steps of applying successive layers of the film to tablet cores as they are being tumbled in a coating pan. The stabilized shellac sealing film provides a sealant against moisture for cores containing water-sensitive material, such as cores made of various medicaments.

To further illustrate the invention, the following examples are provided.

Example 1

Ingredients:                                        Amounts, ounces
    6 pound cut refined shellac in ethyl alcohol ___ 160
    Polyvinylpyrrolidone _____ 10
    SDA 3-A alcohol _____ 102

The polyvinylpyrrolidone is dissolved in the alcohol and then the shellac is stirred into the mixture.

The 6 pound cut refined shellac in ethyl alcohol contains 45% shellac solids so that of the 160 ounces of this ingredient there is present 72 ounces of shellac solids and 88 ounces of ethyl alcohol.

Example 2

Ingredients:                                        Amounts, ounces
    6 pound cut refined shellac in ethyl alcohol ___ 160
    Polyvinylpyrrolidone _____ 10
    Acetylated monoglyceride _____ 10
    SDA 3-A alcohol _____ 136

The polyvinylpyrrolidone and the acetylated monoglyceride are dissolved in the alcohol and then the shellac is stirred into the solution.

The 6 pound cut of refined shellac in ethyl alcohol is 45% shellac solids so that of the 160 ounces of this ingredient, there are 72 ounces of shellac solids and 88 ounces of ethyl alcohol. The acetylated monoglyceride is a plasticiber that reduces brittleness and increases the flexibility of the stabilized shellac film.

The solutions of Examples 1 and 2 are stable in storage, and the films they form on tablets and the like are quite stable after deposition. The solutions of Examples 1 and 2 may be used to produce a sealing coating on tablets, candies, nuts, or any sort of solid piece. These solutions may also be used effectively to produce a film on sugar coated pieces that provides a print base or pre-waxed base or seal against gases and moisture penetration.

Example 3

18 pounds of sugar coated tablets were placed in an 18 inch stainless steel pan and the pan was rotated to turn and tumble the tablets therein. Then 30 millimeters of the solution of Example 2 were applied to the tablets by ladeling the solution into the pan. After a few minutes of turning, the coating on the tablets dried without gumming or picking. The preprint base formed by this stabilized shellac film coating did not measurably delay disintegration times when measured just after the tablet coatings had dried, and also when measured during the course of the following six months.

Example 4

Two volumes of the solution of Example 2 were mixed by stirring with one volume of OPASPRAY, a solution of approved color additives suspended in ethyl alcohol and made by Colorcon, Inc., West Point, Pa. A quantity of tablets were placed in a coating pan and the pan was rotated to tumble the tablets. The mixture of the solution of Example 2 with the OPASPRAY solution of a desired color were sprayed onto the tablets rolling in the pan until full color was developed. The tablets were sealed and finished in this one operation.

Example 5

Ingredients:                                        Amounts, ounces
    4 pound cut shellac in ethyl alcohol _____ 196
    Cetyl alcohol _____ 3.6
    Isopropyl alcohol _____ 42.6
    Sorbitan monooleate (Atlas' Span 80) _____ 5.7
    Sorbitan trioleate (Atlas' Span 85) _____ 5.7
    FD & C yellow No. 5 Lake _____ 48
    FD & C yellow No. 6 Lake _____ 20
    Titanium dioxide _____ 52
    Polyvinylpyrrolidone _____ 13

The Lakes and titanium dioxide were dispersed in the shellac by stirring, and then the other ingredients were added and stirred together. This formulation was ladeled or sprayed on tablets to achieve a uniform color coating.

The 4 pound cut shellac in ethyl alcohol is 37% by weight of shellac solids so that of the 196 ounces of this ingredient, 72½ ounces were shellac solids and 123½ ounces were ethyl alcohol.

The cetyl alcohol is a detackifier that prevents picking in the coating operation. The isopropyl alcohol is a solvent. The sorbitan monooleate and sorbitan trioleate are plasticizers that prevent the film from becoming too brittle and increase the flexibility of the film. Span 80 is sorbitan monooleate and Span 85 is sorbitan trioleate made by Atlas Chemical Industries, Inc., Wilmington, Del. The lakes and titanium dioxide are colorants.

Although the preferred ratio by mole of polymer free basic groups to shellac free acid groups is 1 to 1, as illustrated by Examples 1-5, as little as 1% by weight of the polymer compared to the shellac solids has been found helpful in stabilizing the shellac film coating. This 1% PVP by weight gives a ratio by mole of PVP basic groups to the shellac free acid groups of about .1 to 1.

Moreover, as much as 20% by weight of the polymer compared to the shellac solids has been found helpful in stabilizing the shellac film without losing the moisture sealing characteristic of the shellac film. However, above said 20%, the shellac film becomes increasingly water sensitive and moisture permeable. This 20% PVP by weight gives a ratio by mole of PVP basic groups to the shellac free acid groups of about 1.3 to 1.

Examples of shellac films ranging from 1–20% PVP by weight to shellac solids are as follows:

Example 6

Ingredients:                                        Amounts, ounces
    6 pound cut shellac in ethyl alcohol _____ 160
    Polyvinylpyrrolidone _____ 7
    Acetylated monoglyceride _____ 7

The polyvinylpyrrolidone is dissolved into the shellac solution, and then the acetylated monoglyceride, a plasticizer, is stirred into the mixture. The ratio of polyvinylpyrrolidone to shellac solids by weight is about 1 to 10, and the ratio by mole of the polyvinylpyrrolidone free basic groups to the shellac free acid groups is about .6 to 1.

Example 7

Ingredients: Amounts, ounces
6 pound cut shellac in ethyl alcohol _____ 160
Polyvinylpyrrolidone _____ 1
Castor oil _____ 10

The polyvinylpyrrolidone is dissolved into the shellac solution and then the castor oil, a plasticizer, is stirred into the mixture. The ratio of polyvinylpyrrolidone to shellac solids by weight is about .14 to 10, and the ratio by mole of the polyvinylpyrrolidone free basic groups to the shellac free acid groups is about .1 to 1.

Example 8

Ingredients: Amounts, ounces
6 pound cut shellac in ethyl alcohol _____ 160
Polyvinylpyrrolidone _____ 14
Acetylated monoglyceride _____ 10

The polyvinylpyrrolidone is dissolved into the shellac solution and then the acetylated monoglyceride is stirred into the mixture. The ratio by weight of polyvinylpyrrolidone to shellac solids by weight is about .2 to 1, and the ratio by mole of the polyvinylpyrrolidone free basic groups to the shellac free acid groups is about 1.3 to 1.

Besides polyvinylpyrrolidone, other polymeric materials containing basic groups may be used when the shellac solution. Such other polymeric materials include polyvinylpyridine and condensation polymers of polymerized linoleic acid with polyamines of the general formula n—HOOCRCOOH, where R is an alkyl group, plus n—H$_2$NR'NH$_2$, where R' is an alkyl amine, and are illustrated in the following examples.

Example 9

Ingredients: Amounts, ounces
6 pound cut refined shellac in ethyl alcohol ___ 160
Polyvinylpyridine _____ 10
SDA 3-A alcohol _____ 102

Example 10

Ingredients: Amounts, ounces
6 pound cut refined shellac in ethyl alcohol ___ 160
Polyvinylpyridine _____ 10
Acetylated monoglyceride _____ 10
SDA 3-A alcohol _____ 102

Example 11

Ingredients: Amounts, ounces
4 pound cut shellac in ethyl alcohol _____ 196
Cetyl alcohol _____ 3.6
Isopropyl alcohol _____ 42.6
Sorbitan monooleate (Atlas' Span 80) _____ 5.7
Sorbitan trioleate (Atlas' Span 85) _____ 5.7
FD&C yellow No. 5 Lake _____ 48
FD&C yellow No. 6 Lake _____ 20
Titanium dioxide _____ 52
Polyvinylpyridine _____ 13

Example 12

Ingredients: Amounts, ounces
6 pound cut refined shellac in ethyl alcohol ___ 160
Polyamide Versamid 125 _____ 20
SDA 3-A alcohol _____ 102

Polyamide Versamid 125 is a polyamide resin made by General Mills, Inc., one of the condensation products of polyamines such as diethylene triamine with a polymeric fatty acid known as dimer acid, a major component of which is a 36-carbon atom dibasic acid. See "The Inherent Corrosion Inhibiting Properties of the Polyamide-Epoxy Vehicle," Wittcoff and Baldwin, Journal of Paint Technology, vol. 38, No. 500, February 1966, pp. 556–563.

Example 13

Ingredients: Amounts, ounces
6 pound cut refined shellac in ethyl alcohol ___ 160
Polyamide Versamid 140 _____ 20
SDA 3-A alcohol _____ 102

Polyamide Versamid 140 is another polyamide resin made by General Mills, Inc., and described in the above publication.

I claim:
1. A tablet for oral use comprising a core, and a clear stabilized shellac moisture-barrier coating consisting essentially of shellac and polyvinylpyrrolidone, said shellac containing free acid groups, said polyvinylpyrrolidone having free basic groups, the ratio by mole of said shellac acid groups to said polyvinylpyrrolidone basic groups being about 1.0 shellac to .1–1.3 polyvinylpyrrolidone.

2. The tablet of claim 1, wherein the ratio by mole of said free acid groups to said free basic groups is about 1 to 1.

3. The tablet of claim 1 wherein the ratio by weight of shellac to polyvinylpyrrolidone is about 600–900 parts of shellac to about 111 parts of polyvinylpyrrolidone.

4. The tablet of claim 1 wherein the ratio by weight of shellac to polyvinylpyrrolidone is about 72 ounces of shellac to about 10 ounces of polyvinylpyrrolidone.

5. The tablet of claim 1 wherein the ratio by weight of shellac to polyvinylpyrrolidone is about 72½ ounces of shellac to about 13 ounces of polyvinylpyrrolidone.

References Cited

UNITED STATES PATENTS

| | | | |
|---|---|---|---|
| 3,576,663 | 4/1971 | Signorino et al. | 117—72 |
| 2,954,322 | 9/1960 | Heilig et al. | 424—33 |
| 3,297,535 | 1/1967 | Butler et al. | 424—34 |
| 3,390,049 | 6/1968 | Rednick et al. | 260—27 R X |

RALPH HUSACK, Primary Examiner

U.S. Cl. X.R.

99—134, 166; 117—72, 91, 109, 161 UA, UZ, 168; 424—33, 34